United States Patent
Thompson et al.

(10) Patent No.: US 12,449,805 B2
(45) Date of Patent: *Oct. 21, 2025

(54) UNMANNED AERIAL VEHICLE (UAV) CONTROLLER

(71) Applicant: Skydio, Inc., San Mateo, CA (US)

(72) Inventors: Benjamin Scott Thompson, San Carlos, CA (US); Christopher Brian Grasberger, Burlingame, CA (US); Patrick Allen Lowe, Palo Alto, CA (US); Asher Mendel Robbins-Rothman, Redwood City, CA (US); Yevgeniy Kozlenko, Mountain View, CA (US); Logan Sweet, San Francisco, CA (US); Blair Williams, Redwood City, CA (US); Joseph Anthony Enke, San Carlos, CA (US)

(73) Assignee: Skydio, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/590,649

(22) Filed: Feb. 28, 2024

(65) Prior Publication Data

US 2024/0255944 A1    Aug. 1, 2024

Related U.S. Application Data

(63) Continuation of application No. 17/713,486, filed on Apr. 5, 2022, now Pat. No. 11,947,348.

(Continued)

(51) Int. Cl.
*G05D 1/00* (2024.01)
*B64C 39/02* (2023.01)
(Continued)

(52) U.S. Cl.
CPC ......... *G05D 1/0016* (2013.01); *B64C 39/024* (2013.01); *G05D 1/0022* (2013.01);
(Continued)

(58) Field of Classification Search
CPC ........ G05D 1/224; G05D 1/101; G05D 1/226; G05D 1/0022; G05D 1/0016; B64C 39/024; B64U 2201/20; B64U 2101/00
See application file for complete search history.

(56) References Cited

U.S. PATENT DOCUMENTS 11,079,752 B1 * 8/2021 Lombardini ........... B64U 50/19
2006/0215978 A1 * 9/2006 Choy ................... B65D 81/025
385/134

(Continued)

FOREIGN PATENT DOCUMENTS

WO    0030267 A1    5/2000

*Primary Examiner* — Anne Marie Antonucci
*Assistant Examiner* — Jared C Bean
(74) *Attorney, Agent, or Firm* — Young Basile Hanlon & MacFarlane, P.C.

(57) ABSTRACT

An apparatus that includes a controller of an unmanned aerial vehicle (UAV), a cover, and antennas integrated into the cover and electrically connect to circuitry of the controller. The controller includes control elements configured to receive inputs. The cover is coupled to the controller and movable between a closed position, in which the control elements are covered, and an open position in which the control elements are exposed. The cover includes one or more ribs integrated into an interior surface of the cover and defining cavities of the cover. The cover also includes a conductive plane coupled to the one or more ribs that encloses the cavities.

20 Claims, 10 Drawing Sheets

Related U.S. Application Data

(60) Provisional application No. 63/171,879, filed on Apr. 7, 2021.

(51) Int. Cl.
   *G05D 1/224* (2024.01)
   *G05D 1/226* (2024.01)
   *B64U 101/00* (2023.01)

(52) U.S. Cl.
   CPC .............. *G05D 1/101* (2013.01); *G05D 1/224* (2024.01); *G05D 1/226* (2024.01); *B64U 2101/00* (2023.01); *B64U 2201/20* (2023.01)

(56) References Cited

U.S. PATENT DOCUMENTS

| | | | | |
|---|---|---|---|---|
| 2011/0050508 A1* | 3/2011 | Guterman | ............ | H01Q 9/0407 343/702 |
| 2017/0271769 A1* | 9/2017 | Beens | .................... | H01Q 1/273 |
| 2019/0081387 A1* | 3/2019 | Pandya | .................... | H04L 69/18 |
| 2019/0356051 A1* | 11/2019 | Barrera | .................... | H01Q 1/44 |
| 2020/0337151 A1 | 10/2020 | Zhu et al. | | |
| 2021/0343170 A1 | 11/2021 | Meier | | |

\* cited by examiner

UNMANNED AERIAL VEHICLE (UAV) CONTROLLER

CROSS-REFERENCE TO RELATED APPLICATION(S)

This application is a continuation of U.S. patent application Ser. No. 17/713,486, filed Apr. 5, 2022, which claims priority to and the benefit of U.S. Provisional Patent Application No. 63/171,879, filed Apr. 7, 2021, the entire disclosures of which are hereby incorporated by reference in their entirety.

FIELD

This disclosure relates generally to unmanned aerial vehicles and, more specifically, to a wireless controller for an unmanned aerial vehicle.

BACKGROUND

An unmanned aerial vehicle (UAV) is an aircraft that can fly without a human operator onboard. The flight of a UAV may be controlled by a human operator using a wireless controller to communicate with the UAV.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
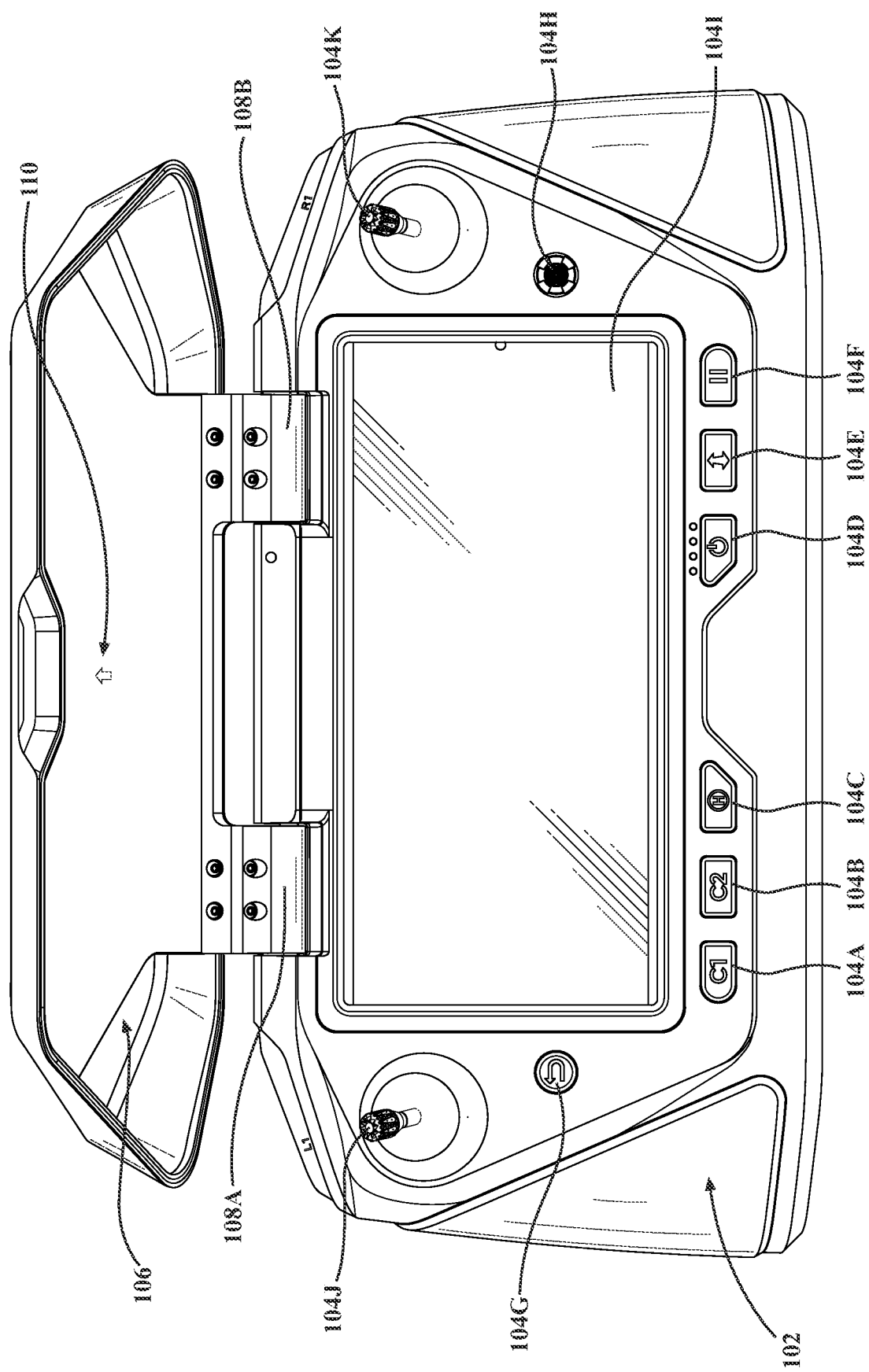
FIG. 1 is an isometric view of an upper portion of an example of a controller for an unmanned aerial vehicle (UAV) in which the controller has a cover in an open position.

To control an unmanned aerial vehicle (UAV), a human operator (also referred to as a "user") may use one or more control elements to provide inputs to a wireless UAV controller and may receive outputs from the controller. The control elements may include, for example, buttons, directional pads, light emitting diodes (LEDs), joysticks, an electronic touchscreen, and the like. Based on the inputs to and/or the outputs from the control elements, the controller may use one or more antennas to send commands to the UAV and/or receive responses from the UAV, such as for controlling flight of the UAV. However, the control elements and/or the antennas may be vulnerable to environment conditions. For example, the control elements and/or the antennas may be susceptible to breaking should the controller be dropped. Additionally, circuitry inside the controller may be susceptible to overheating, particularly during extended use. Moreover, a user providing inputs via the control elements, such as by pushing downward on buttons, may affect relatively sensitive circuitry inside the controller in proximity to the control elements, such as an inertial measurement unit (IMU). A need therefore exists to improve protection of the control elements, the antennas, and/or the circuitry inside the controller.

Implementations of this disclosure address problems such as these by integrating one or more antennas used by a controller in a cover that is configured to enclose one or more of the control elements. The cover may be movable between a closed position in which the control elements may be covered (e.g., inaccessible to a user) and an open position in which the control elements may be exposed (e.g., accessible to a user). For example, the cover may be configured as a clamshell cover that is coupled to the controller via one or more hinges. The control elements may include a first subset of control elements, such as buttons, directional pads, touchscreens, and LEDs, and/or a second subset of control elements, such as joysticks and a detachable portable electronic device. The cover may be configured to protect both the first subset of control elements and the second subset of control elements, such as by providing an interior cavity that encloses such control elements when the cover is in the closed position. Using the controller to control a UAV may involve opening the cover to access the control elements. Opening the cover may cause the antennas that are integrated in the cover to angle upward in a direction overhead toward a UAV (e.g., opening the cover may angle the antennas toward the UAV). Indeed, when the cover is open, the antennas may be configured to direct more energy associated with radio frequency (RF) communications (e.g., RF energy) in a direction toward the UAV (e.g., beamforming). In some implementations, an array of antennas, such as at least four antennas, may be integrated in the cover.

In some implementations, a conductive plane may be integrated in the cover, such as between the antennas and the control elements. The conductive plane may be configured to further direct RF energy associated with the antennas in a direction toward a UAV. In some implementations, an insulating plane may be integrated in the cover, such as between the antennas and the control elements, and/or between the conductive plane and the control elements when the conductive plane is present. The insulating plane may be configured to isolate the RF energy associated with the antennas from the control elements and/or the user. In some implementations, a heatsink and/or a fan may be arranged on an under portion of the controller. The heatsink and/or the fan may permit cooling of circuitry arranged inside the controller without interfering with use of the controller by a user (e.g., without interfering with the control elements arranged on an upper portion of the controller that is opposite of the lower portion). In some implementations, a support mechanism may be arranged on the under portion of the controller. The support mechanism may be configured to move between an outward position in which the support mechanism may support the controller when the controller is on a surface and an inward position in which the support mechanism may be retracted along a contour of the under portion. In some implementations, a circuit board may be arranged inside the controller. The circuit board may implement various circuitry, including control element circuitry that is electrically connected to the control element(s) and IMU circuitry configured to provide IMU measurements. The circuit board may include a cutout configured to separate in part (e.g., physically isolate, such as by a windy circuit board lead or an air gap) the control element circuitry from the IMU circuitry on the circuit board. The cutout may protect the IMU circuitry, such as from flex that may be caused by a user pushing on buttons electrically connected to the control element circuitry, thereby improving the accuracy of the IMU measurements.

FIG. 1 is an isometric view of an upper portion of an example of a controller 102 for a UAV in which the controller 102 has a cover 106 in an open position. The controller 102 may be a handheld wireless UAV controller that is configured to be operated by a user to control the flight of a UAV. The controller 102 may have control elements configured to receive inputs from a user and/or provide outputs to a user, such as control elements 104A through 104K. The control elements may include a first subset of control elements, such as control elements 104A through 104G comprising buttons, a control element 104H comprising a directional pad, and a control element 104I comprising an electronic touchscreen. For example, in some configurations, the touchscreen (e.g., implemented by the control element 104I) may be used to replicate one or more of the control elements 104A through 104H, 104J and/or 104K, via a graphical user interface (GUI), for receiving inputs from the user and/or providing outputs to the user. This may provide a back-up for one or more of the control elements 104A through 104H, 104J and/or 104K, such as in the event of damage to one or more of the control elements. In some implementations, the first subset of control elements may also include LEDs. The first subset of control elements may be characterized by a reduced height from the controller 102 (e.g., relatively shorter). In some implementations, a control element in the first subset may have a height from the controller 102 that is less than its length and less than its width (e.g., a height that is less than any dimension associated with its footprint). The control elements may also include a second subset of control elements, such as control elements 104J and 104K comprising joysticks. In some implementations, the second subset of control elements may also include the user's portable electronic device, being detachable from the controller 102. For example, the user's portable electronic device could be in place of the control element 104I (e.g., the touchscreen). The second subset of control elements may be characterized by an increased height from the controller 102 (e.g., relatively taller). For example, the second subset of control elements may have a height from the controller 102 that is greater than a height of any of the control elements of the first subset. In some implementations, a control element in the second subset may have a height from the controller 102 that is greater than its length and greater than its width (e.g., a height that is greater than any dimension associated with its footprint).

The cover 106 may be coupled to the controller 102. The cover 106 may be electrically insulating and electromagnetically transmissive. The cover 106 may be movable between a closed position in which the control elements (e.g., the control elements 104A through 104K) may be covered and an open position in which the control elements may be exposed. As shown in FIG. 1, the cover 106 is in the open position. In the open position, the control elements may be accessible to a user (e.g., a user holding the controller 102 may access the control elements 104A through 104K), such as for controlling flight of a UAV. In some implementations, the cover 106 may be coupled to the controller 102 in a manner that provides rotational movement between the cover 106 and the controller 102. For example, the cover 106 may be coupled to the controller 102 via one or more hinges that may be arranged at couplings 108A and 108B. In some implementations, the cover 106 may be configured as a clamshell that is coupled to the controller 102 by a hinge.

One or more antennas may be integrated in the cover 106. In some implementations, an array of antennas, such as at least four antennas, may be integrated in the cover. 106. The antennas may be electrically connected to communications circuitry arranged inside the controller 102 for communicating with a UAV. For example, the antennas may be electrically connected to the communications circuitry via wiring that is routed along the couplings 108A and 108B (e.g., electrically insulated copper wires). Using the controller 102 to control a UAV may involve opening the cover 106 to the open position (e.g., rotating the cover 106 upward, away from the control elements 104A through 104K of the controller 102) to permit a user to access the control elements. Thus, opening the cover 106 may expose the control elements. Additionally, opening the cover 106 may cause the antennas that are integrated in the cover 106 to angle upward (e.g., with the cover 106) in a direction overhead, toward a UAV (e.g., opening the cover may angle the antennas toward the UAV). This may permit an improved line of sight between the antennas and the UAV for improved radio communication (and thus, an improved operating range). Additionally, the antennas may be configured to direct RF energy upward in the direction overhead, toward a UAV (e.g., beamforming). This may further improve radio communication with a UAV. In some implementations, an interior of the cover may include an indicium 110, such as an arrow pointing upward. The indicium 110 may be used to guide a user to open the cover 106 to point in a direction of the UAV.

Figure 2:
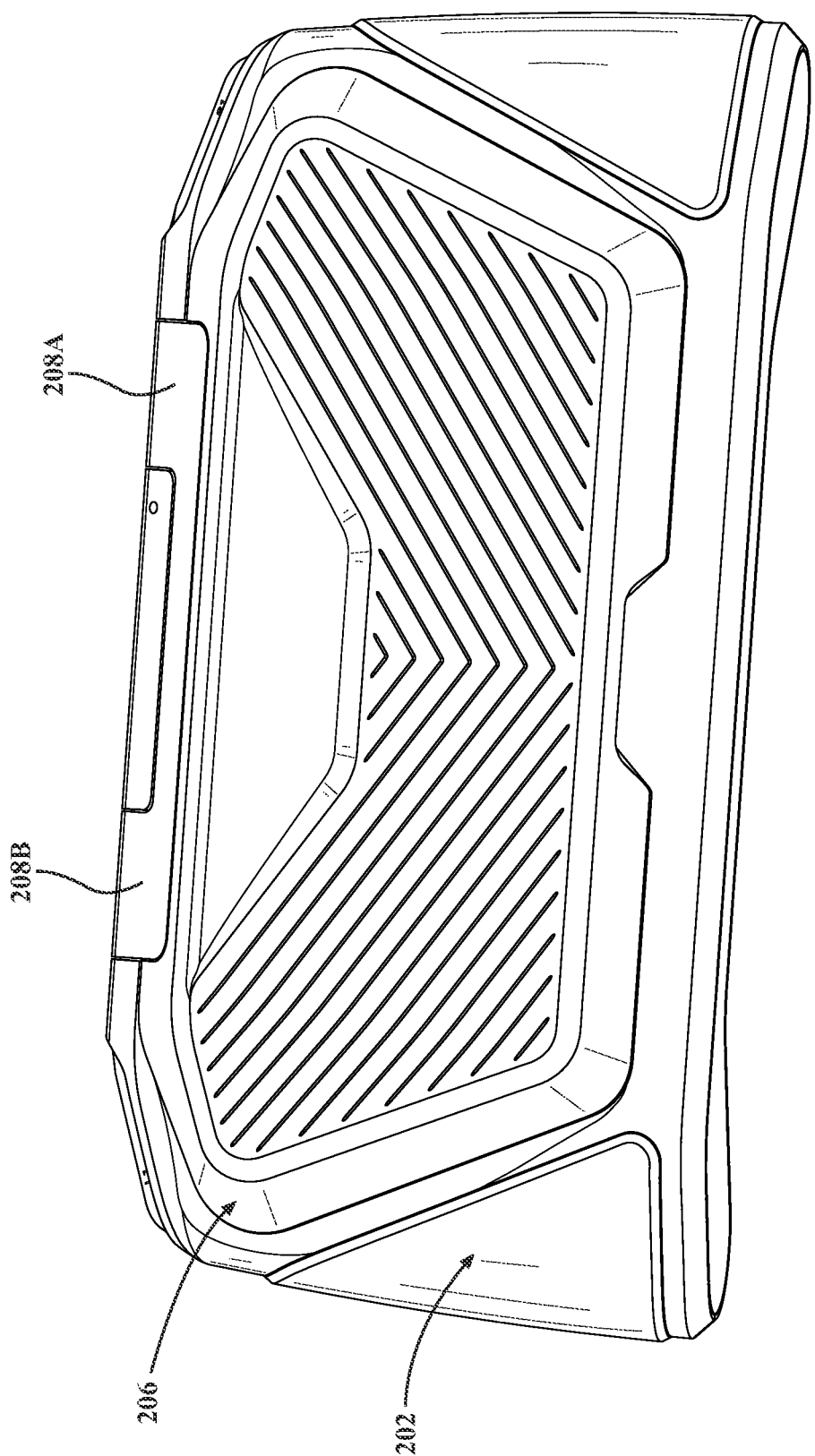
FIG. 2 is an isometric view of an upper portion of an example of a controller having a cover in a closed position.

FIG. 2 is an isometric view of an upper portion of an example of a controller 202 having a cover 206 in a closed position. The controller 202 may for example, be the controller 102 shown in FIG. 1. An upper portion of the controller 202 (e.g., facing upward to the sky) is shown in FIG. 2. The cover 206 (e.g., like the cover 106 shown in FIG. 1) may be coupled to the controller 202. The cover 206 may be movable between a closed position in which control elements (e.g., the control elements 104A through 104K) are covered and an open position in which the control elements are exposed. As shown in FIG. 2, the cover 206 is in the closed position. In the closed position, the control elements may be inaccessible to a user (e.g., a user holding the controller 202 may be unable to access the control elements 104A through 104K). For example, the cover 206 may be closed by rotating the cover 206 toward the controller 202 via the couplings 208A and 208B, which may be like the couplings 108A and 108B shown in FIG. 1, respectively. In the closed position, an interior cavity associated with the cover 206 may provide a volume to enclose the control elements (e.g., the control elements 104A through 104K), including the first subset of control elements (e.g., the control elements 104A and 104I) and the second subset of control elements (e.g., the control elements 104J and 104K being joysticks). Additionally, the antennas integrated in the cover 206 may be protected by the structure of the cover 206. Thus, the cover 206 may be configured to protect the control elements and the antennas when in the closed position and protect at least the antennas when in the open position. Using the controller 202 to control a UAV may involve opening the cover from the closed position (shown in FIG. 2) to the open position (shown in FIG. 1) to permit a user access to the control elements and to permit angling the antennas toward a UAV.

Figure 3:
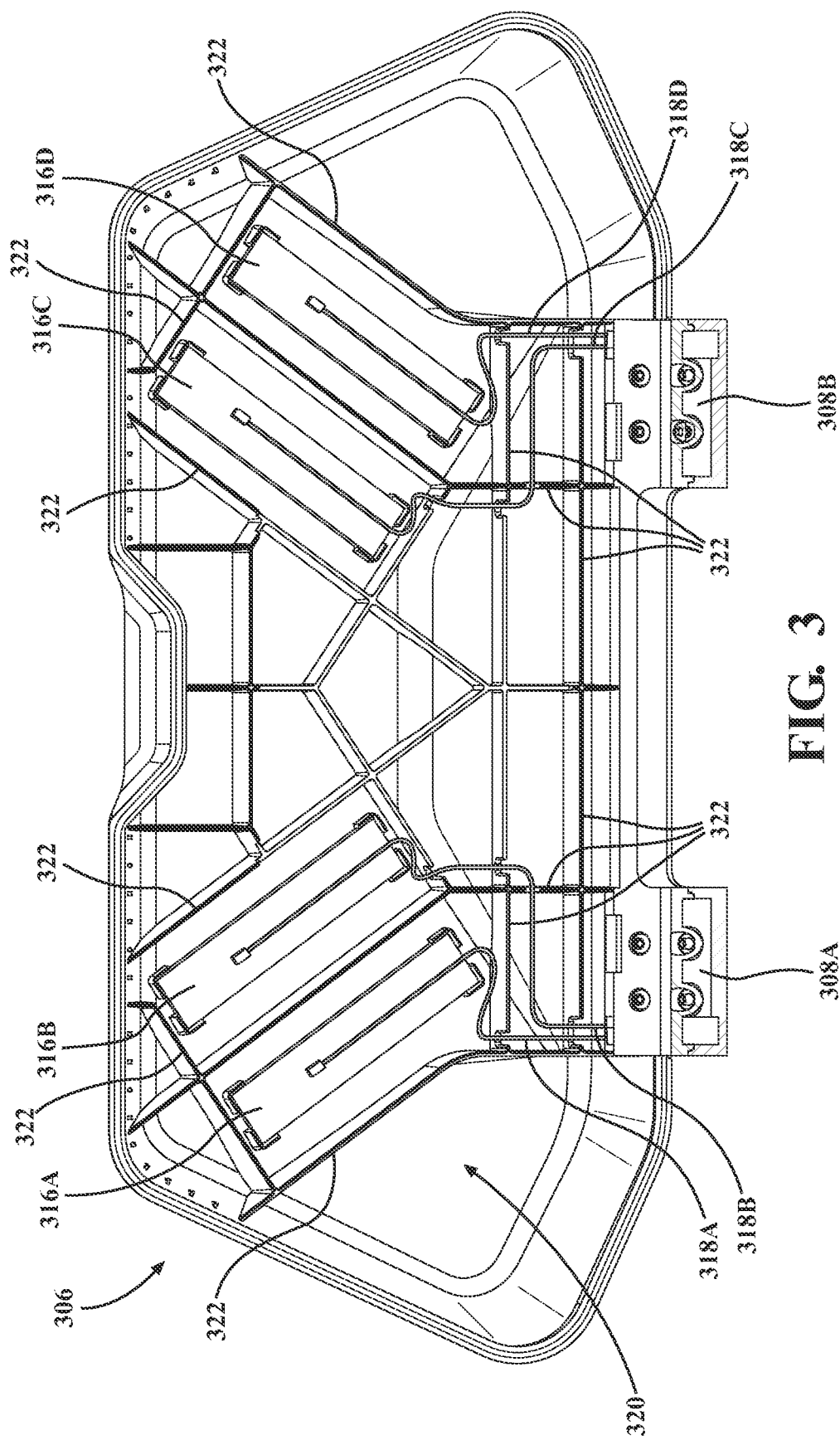
FIGS. 3 and 4 are isometric views of an example of a cover for a controller.
Figure 4:
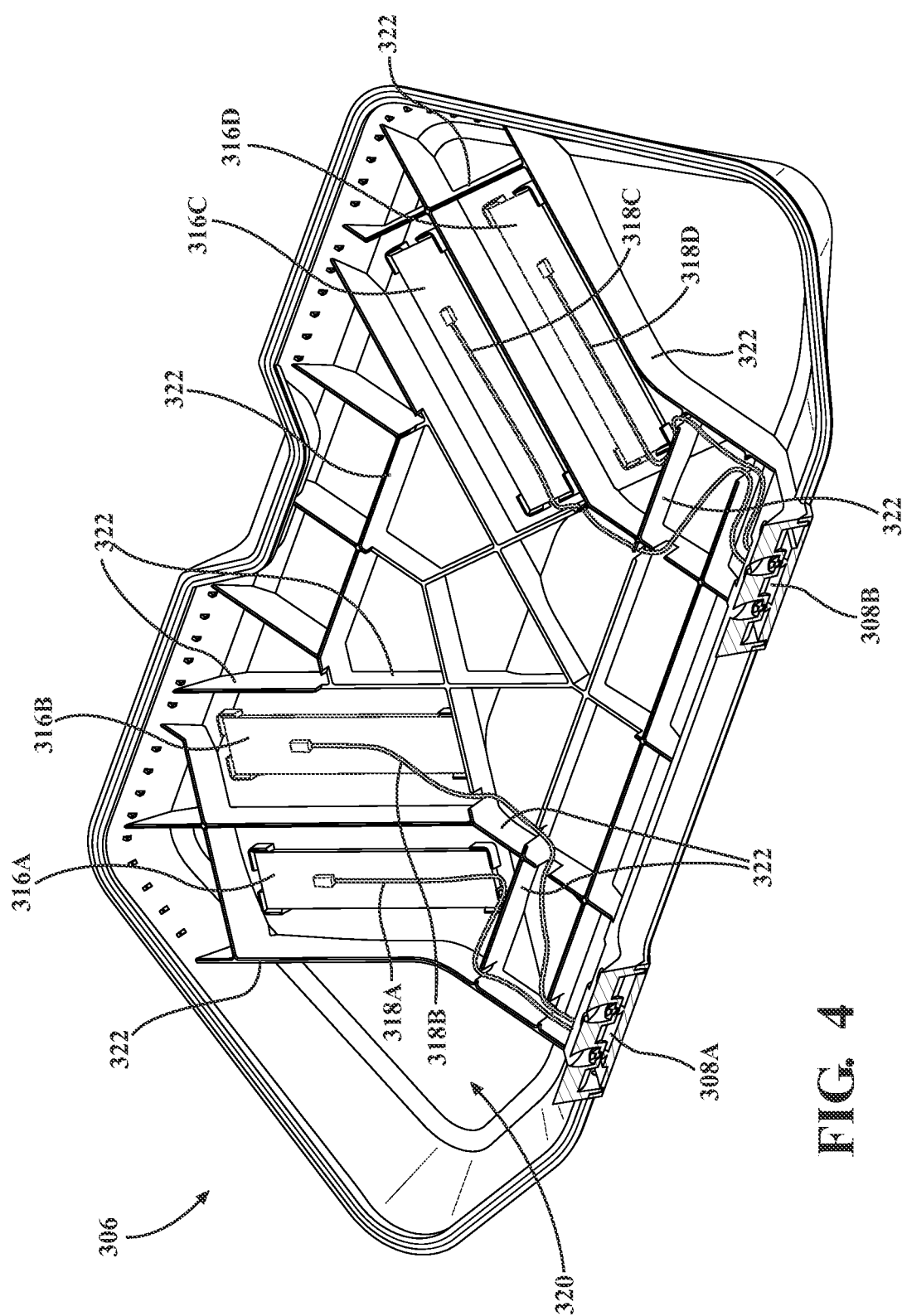

FIGS. 3 and 4 are isometric views of an example of a cover 306 for a controller. The cover 306 may be like the cover 206 shown in FIG. 2 and/or the cover 106 shown in FIG. 1. The cover 306 may be coupled to a controller like the controller 202 shown in FIG. 2 and/or the controller 102 shown in FIG. 1. An interior portion of the cover 306 (e.g., facing a user when in the open position) is shown in FIGS. 3 and 4. One or more antennas may be integrated and/or located in the cover 306, such as antennas 316A through 316D. The antennas may be electrically connected to communications circuitry inside the controller for communicating with a UAV. For example, the antennas may be electrically connected to the communications circuitry via wiring that is routed through or along couplings to the controller, such as wires 318A through 318D, from antennas 316A through 316D, routed along couplings 308A and 308B (e.g., which may be like the couplings 108A and 108B shown in FIG. 1), respectively. For example, wires 318A and 318B, from antennas 316A and 316B, may be routed along coupling 308A, and wires 318C and 318D, from antennas 316C and 316D, may be routed along coupling 308B, respectively. The antennas 316A through 316D may be mounted to the cover 306, such as via screws, while being electrically isolated from the cover 306. The antennas 316A through 316D may be used to implement RF communications with a UAV.

In some implementations, the antennas 316A through 316D may comprise electrically conductive strips. In some implementations, the antennas 316A through 316D may comprise electrically conductive trace antennas embedded in a multilayer printed circuit board (PCB). In some implementations, the antennas 316A through 316D may comprise multiple-input and multiple-output (MIMO) antennas configured to implement multipath propagation. In some implementations, the antennas 316A through 316D may implement Wi-Fi, a family of wireless network protocols, based on, for example, the IEEE 802.11 family of standards. In some implementations, the antennas 316A through 316D may implement ranged protocols, for example, for ultrawide band communication or the like. The antennas 316A through 316D may be configured to direct RF energy upward in a direction overhead, toward a UAV, when the cover 306 is in the open position (e.g., beamforming).

The cover 306 may also include an interior cavity 320. The interior cavity 320 may provide a volume to enclose control elements (e.g., the control elements 104A through 104K) of the controller when the cover 306 is in the closed position. For example, the interior cavity 320 may provide a volume configured to enclose the second subset of control elements regardless of their height. Thus, the cover 306 may be configured to protect the antennas 316A through 316D and the control elements (e.g., the control elements 104A and 104K) when the cover 306 is in the closed position (e.g., protection from breaking should the controller be dropped, as well as liquid and/or dust ingress protection) and at least protect the antennas 316A through 316D when the cover 306 is in the open position.

In some implementations, multiple ribs 322 may be integrated in the cover 306 to define the interior cavity 320 of the cover 306 or saced apart cavities within the interior cavity 320 of the cover 306. For example, the ribs 322 may be arranged at right angles to one another on an interior surface of the cover 306, including around the antennas 316A through 316D. Some or all of the ribs 322 may comprise electrically conductive material. The ribs 322 may be integrated in the cover 306 to permit tuning the antennas 316A through 316D for improved RF communication with the UAV. In some implementations, the ribs 322 may surround the antennas 316A through 316D with electrically conductive material. In various implementations, the ribs 322 may be changed to improve antenna tuning.

Figure 5:
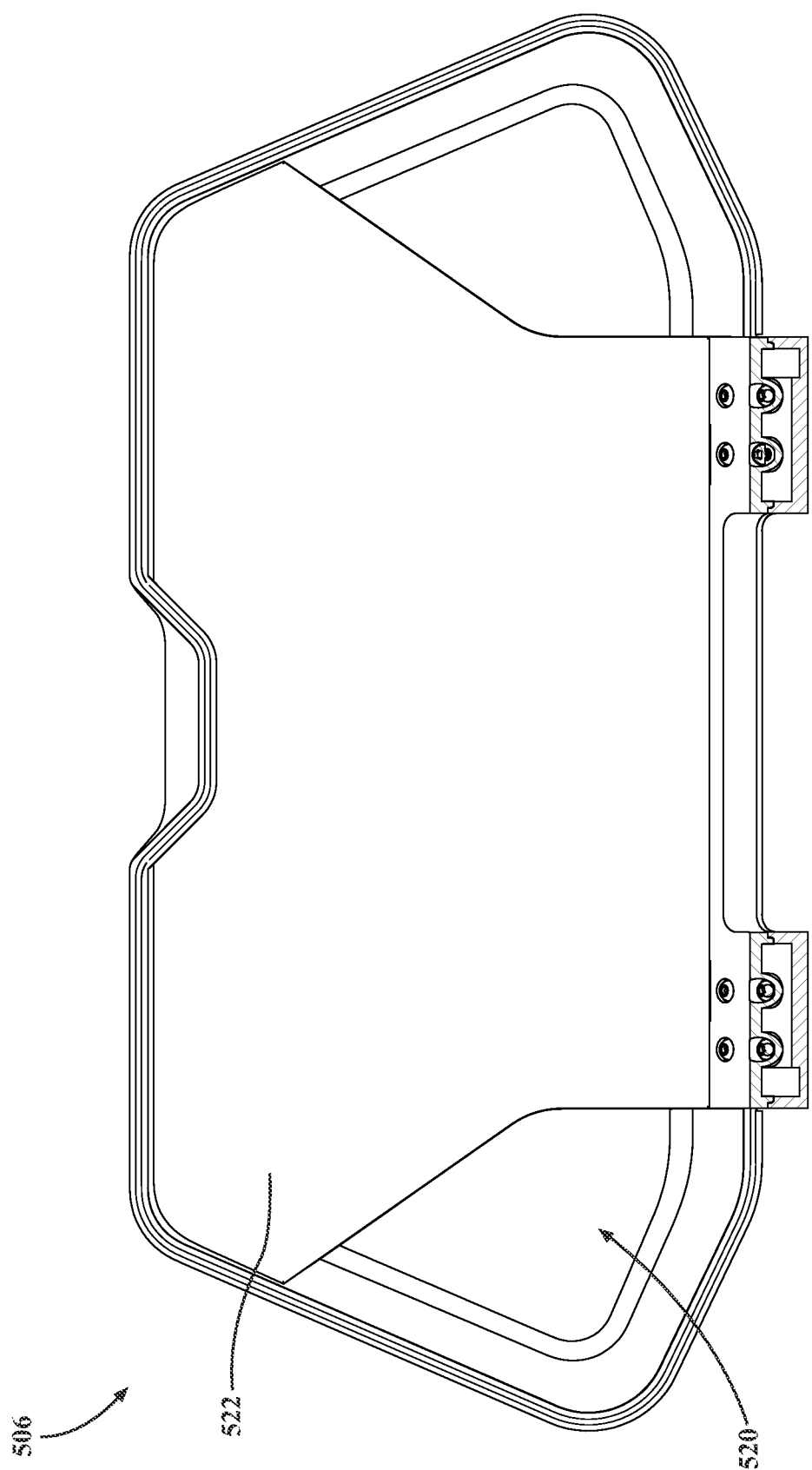
FIG. 5 is an isometric view of an example of a cover for a controller in which the cover has an interior base integrated in the cover.

FIG. 5 is an isometric view of an example of a cover 506 for a controller in which the cover 506 has an interior base 522 integrated in the cover 506. The cover 506 may be like the cover 106 shown in FIG. 1, the cover 206 shown in FIG. 2, and/or the cover 306 shown in FIGS. 3 and 4. The cover 506 may be coupled to a controller like the controller 102 shown in FIG. 1 and/or the controller 202 shown in FIG. 2. The interior base 522 may be integrated in the cover 506. For example, the interior base 522 may be mounted to the cover 106 via mounting screws. The interior base 522 may follow a contour of an interior cavity 520 of the cover 506, which may be like the interior cavity 320 shown in FIG. 4.

In some implementations, the interior base 522 may comprise a conductive plane. The conductive plane may comprise an electrically conductive material. The conductive plane may be configured to further direct RF energy associated with the antennas (e.g., the antennas 316A through 316D) in a direction away from a user holding the controller and toward a UAV. In some implementations, the interior base 522 may comprise an insulating plane. The insulating plane, like the cover 506, may comprise an electrically insulating material (e.g., plastic). The insulating plane may be configured to electrically isolate the antennas from the control elements (e.g., the control elements 104A through 104K located in the interior space of the cover 506) and/or the user. In some implementations, the interior base 522 may comprise both a conductive plane and an insulating plane. The conductive plane and the insulating plane may be implemented on opposing sides of one another (e.g., a first layer comprising the conductive plane that is disposed on and coplanar with a second layer comprising the insulating plane). For example, the conductive plane may be on a first of the interior base 522 facing the antennas, and the insulating plane may be on a second of the interior base 522 facing the control elements, the user, and the like. Thus, when the interior base 522 comprises the conductive plane and the insulating plane, the conductive plane may be between the antennas and insulating plane, and the insulating plane may be between the conductive plane and the control elements, the user, and the like.

In some implementations, the interior base 522 may be mounted to electrically conductive ribs integrated in the cover 506, like the ribs 322 shown in FIGS. 3 and 4, which may extend away from the interior base 522 transverse to the conductive plane and/or insulating plane such that the conductive plane extends across the ribs 322 and contacts terminal ends of the ribs 322. In some implementations, the conductive plane, in electrical contact with the ribs, may operate to tune the RF energy associated with the antennas for communicating with a UAV. In some implementations, the ribs may surround the antennas 316A through 316D, and in such implementations, the conductive plane and the ribs may enclose the antennas 316A through 316D in a three-dimensional electrically conductive box with one side facing outward to the electromagnetically transmissive cover 506 being open.

Figure 6:
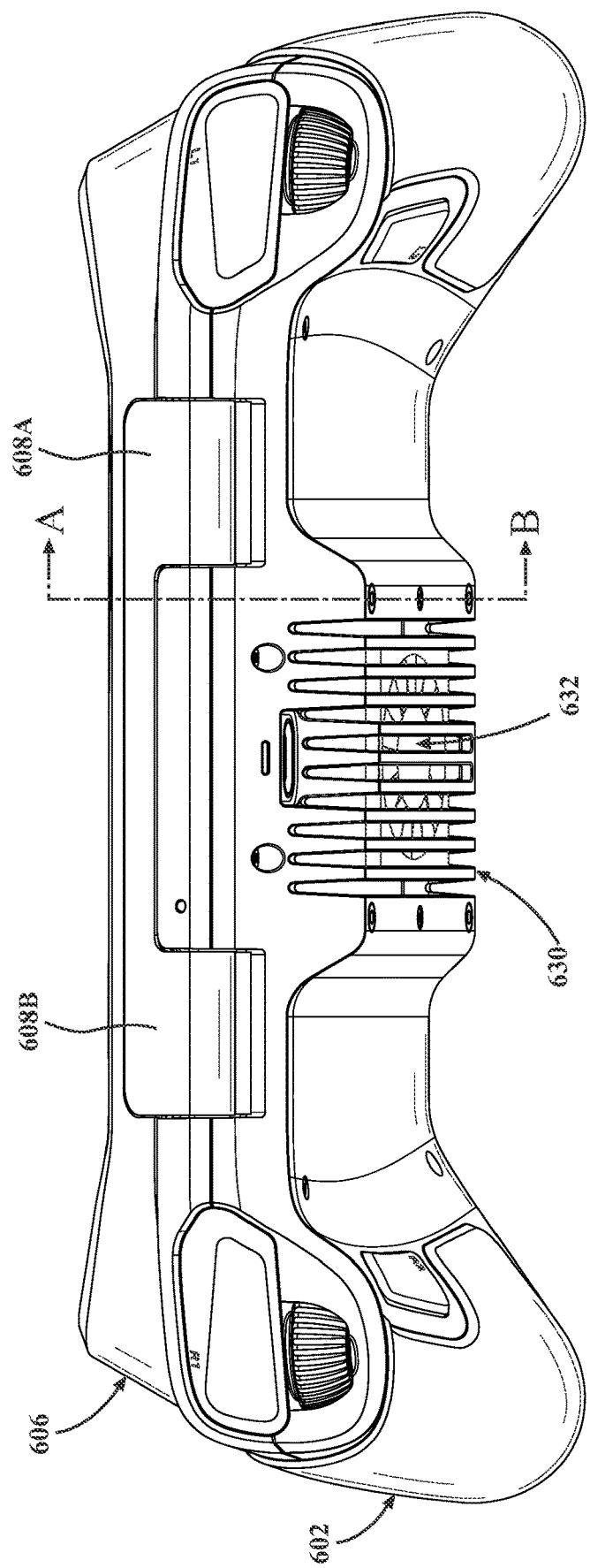
FIGS. 6-8 are isometric views of an example of a controller having a cover.
Figure 7:
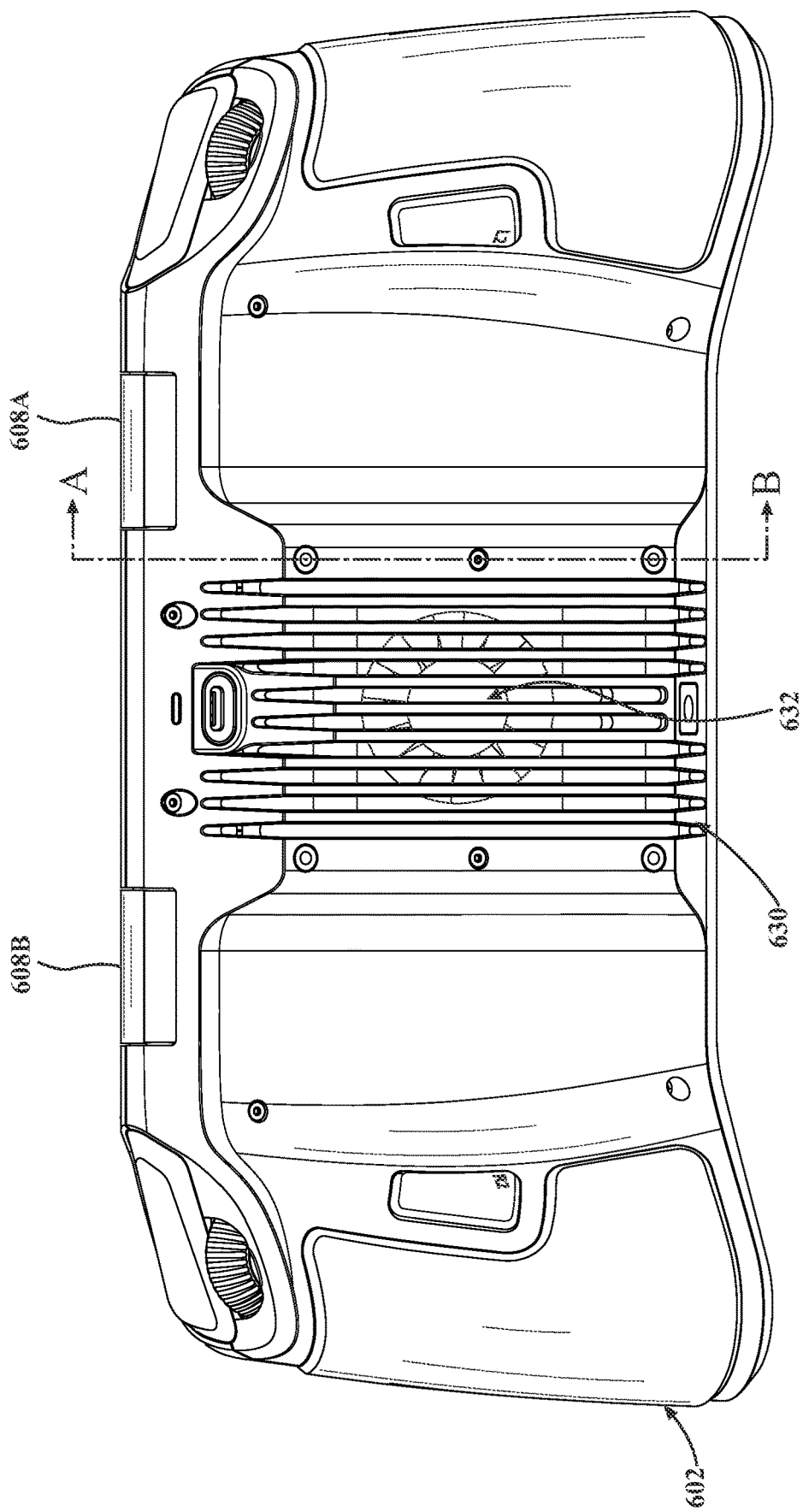
Figure 8:
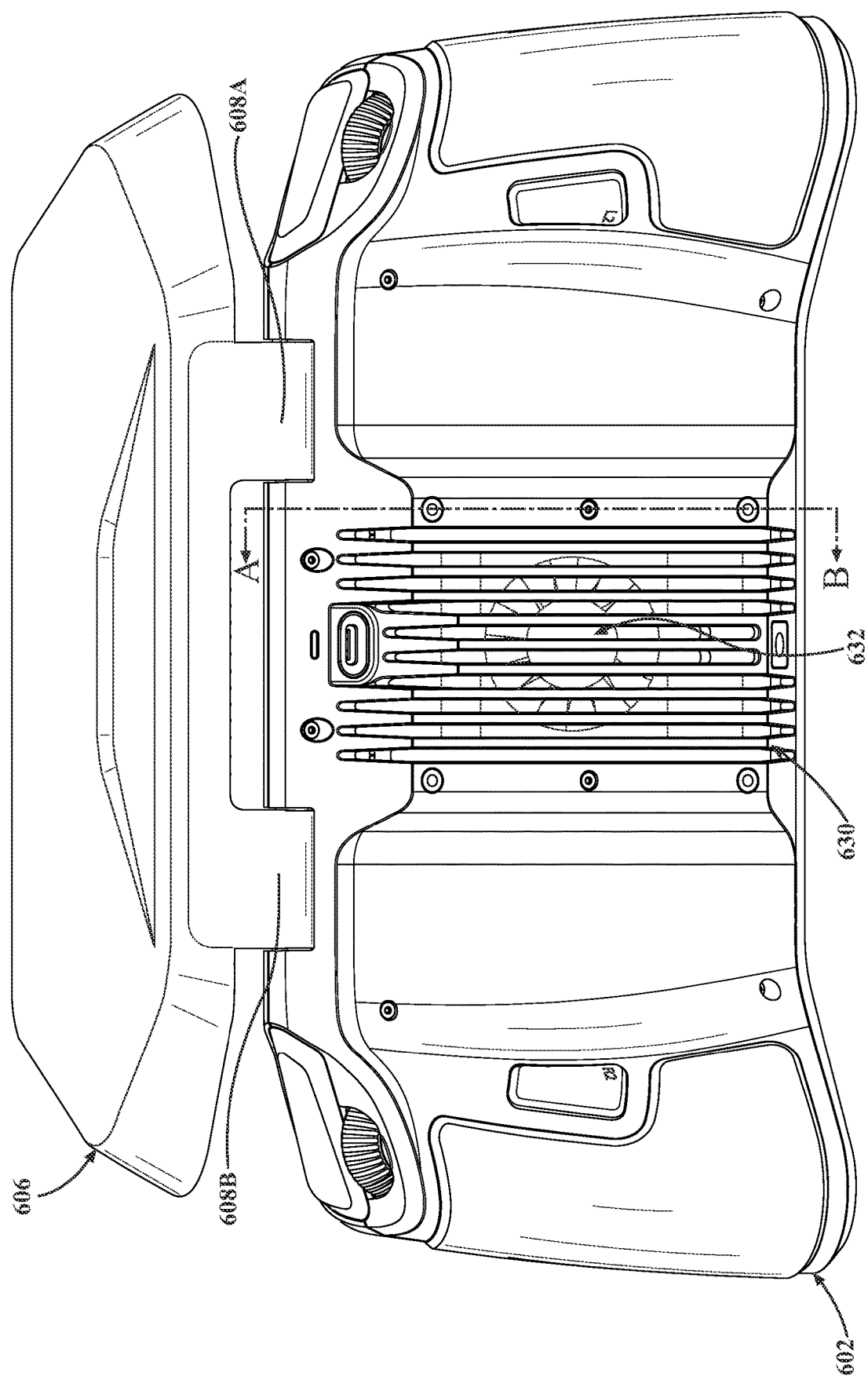

FIGS. 6-8 are isometric views of an example of a controller 602 having a cover 606. The controller 602 may be like the controller 102 shown in FIG. 1 and/or the controller 202 shown in FIG. 2. The cover 606 may be coupled to the controller 602. The cover 606 may be like the cover 106 shown in FIG. 1, the cover 206 shown in FIG. 2, the cover 306 shown in FIGS. 3 and 4, and/or the cover 506 shown in FIG. 5. A rearward portion of the controller 602 (e.g., facing away from a user), with the cover 606 in the closed position, is shown in FIG. 6. For example, the cover 606 may be closed relative to the controller 602 via couplings 608A and 608B (e.g., which may be like the couplings 108A and 108B shown in FIG. 1). An under portion of the controller 602 (e.g., facing the ground), with the cover 606 in the closed position, is shown in FIG. 7. An under portion of the controller 602 (e.g., facing the ground), with the cover 606 in the open position, is shown in FIG. 8. For example, the cover 606 may be open relative to the controller 602, from the closed position shown in FIG. 7 to the open position shown in FIG. 8, via the couplings 608A and 608B.

The controller 602 may include a heatsink 630 which may comprise multiple fins. The heatsink 630 may be arranged on the under portion of the controller 602. The heatsink 630 may be used to cool circuitry that is arranged inside the controller (e.g., the communications circuitry, the control element circuitry, and/or the IMU circuitry). For example, the heatsink 630 may cool circuitry by radiating heat in a direction that is downward relative to the controller 602 (e.g., away from a user). The controller 602 may also include a fan 632. The fan 632 may also be arranged on the under portion of the controller 602. The fan 632 may be coupled with the heatsink 630. For example, the fan 632 may be arranged between the circuitry that is inside the controller and the heatsink 630. The fan 632 may be used to produce an airflow that ingresses into the controller 602 (e.g., ventilates), travels through the controller 602 (and associated circuitry), and egresses through the fins of the heatsink 630 (e.g., exhausts), so as to cool the circuitry. By arranging on the under portion the controller 602, the heatsink 630 and/or the fan 632 may permit cooling of the circuitry without interfering with use of the controller 602 by a user (e.g., without or free of interfering with control elements arranged on the upper portion of the controller 602, such as the control elements 104A and 104K shown in FIG. 1).

Figure 9:
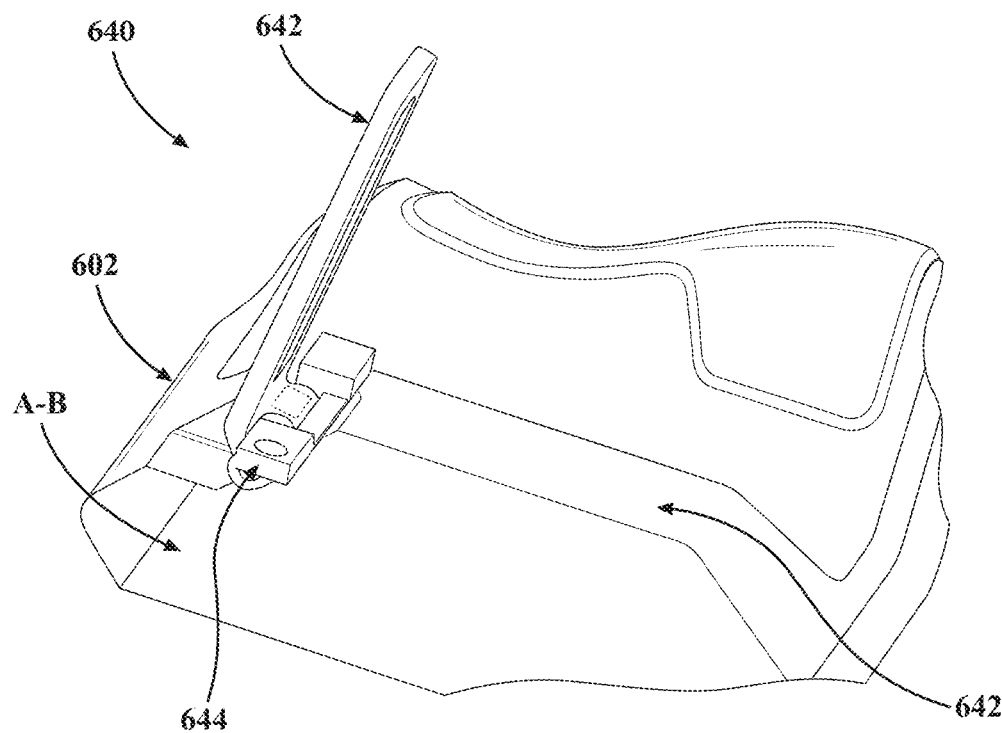
FIG. 9 is a cross section of an isometric view of an example of a controller having a support mechanism.

FIG. 9 is a cross section of an isometric view of the controller 602 having a support mechanism 640. The cross section is taken along the line A-B shown in FIGS. 6-8. An under portion of the controller 602 (e.g., facing the ground) is shown in FIG. 9. The controller 602 may include the support mechanism 640 (e.g., a stand or "kickstand") arranged on the under portion of the controller 602. The support mechanism 640 may be configured to move between an outward position in which the support mechanism 640 supports the controller 602 when the controller 602 is on a surface and an inward position in which the support mechanism 640 is retracted and stowed along a contour 642 of the under portion of the controller 602 (e.g., folded into the controller 602). The support mechanism 640 is shown in the outward position in FIG. 9 (e.g., extended outward so as to support the controller 602 against a surface such as a table). For example, the support mechanism 640 may be coupled to the controller 602 via a hinge that may be arranged at a support mechanism coupling 644.

Figure 10:
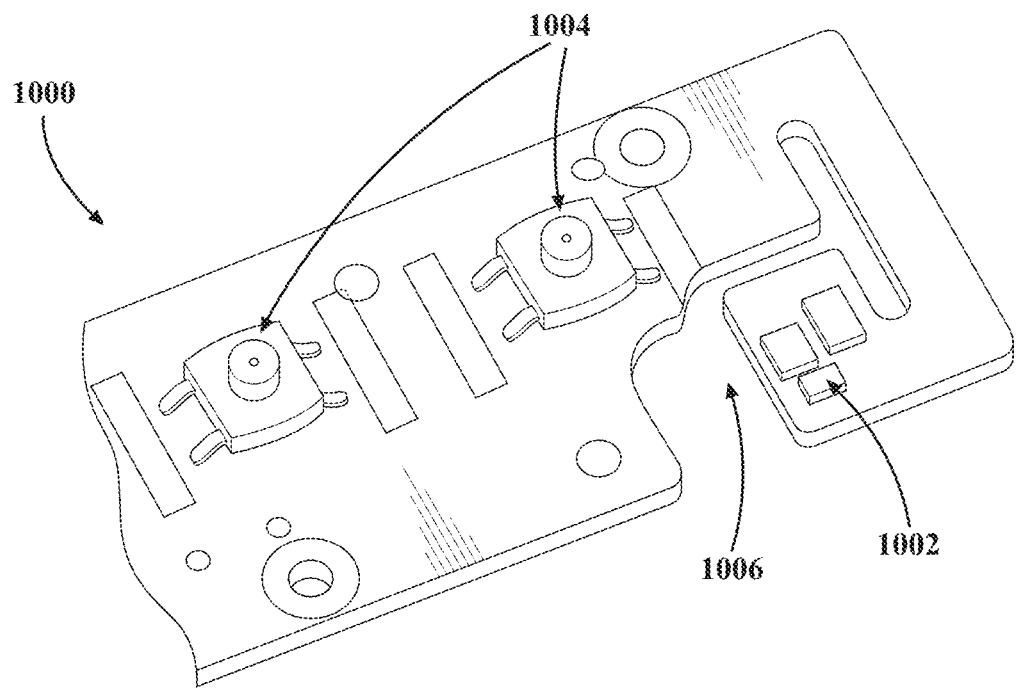
FIG. 10 is an isometric view of an example of a circuit board that may be used in a controller for a UAV.

FIG. 10 is an isometric view of a circuit board 1000 that may be used in a controller for a UAV. The circuit board 1000 may be arranged inside a controller like the controller 102 shown in FIG. 1, the controller 202 shown in FIG. 2, and/or the controller 602 shown in FIGS. 6-9. Circuitry inside the controller (e.g., the communications circuitry, the control element circuitry, and/or the IMU circuitry) may be mounted to the circuit board 1000. For example, the circuit board 1000 may be a multilayer printed circuit board (PCB). In some implementations, the heatsink 630 and/or the fan 632 may be used to cool circuitry mounted to the circuit board 1000.

The circuit board 1000 may implement relatively more sensitive circuitry, such as IMU circuitry 1002 configured to provide IMU measurements via one or more IMU components. The circuit board 1000 may also implement relatively less sensitive circuitry, such as control element circuitry 1004 configured to receive inputs via control elements (e.g., like the control elements 104A and 104K shown in FIG. 1). As used herein, circuitry may be "sensitive" to the extent that environmental conditions, such as extraneous movement of the circuit board 1000, may affect the operation and/or performance of the circuitry. For example, a user providing inputs via the control elements, such as by pushing downward on buttons (e.g., like the control elements 104A and 104K shown in FIG. 1), which may be received as mechanical actuations at the control element circuitry 1004, may cause extraneous movement of (or stress or strain on) the circuit board 1000. This extraneous movement may affect the operation and/or performance of the IMU circuitry 1002. To mitigate the extraneous movement, the circuit board 1000 may include a cutout 1006 configured to separate the control element circuitry 1004 from the IMU circuitry 1002. For example, the cutout 1006 may physically isolate the IMU circuitry 1002 from the other control element circuitry 1004, such as with a windy circuit board lead that dampens any extraneous movements detected by the IMU circuitry 1002, while advantageously implementing the control element circuitry 1004 and the IMU circuitry 1002 in a single circuit board (e.g., without separating the IMU circuitry 1002 from the control element circuitry 1004 in multiple circuit boards).

Figure 11:
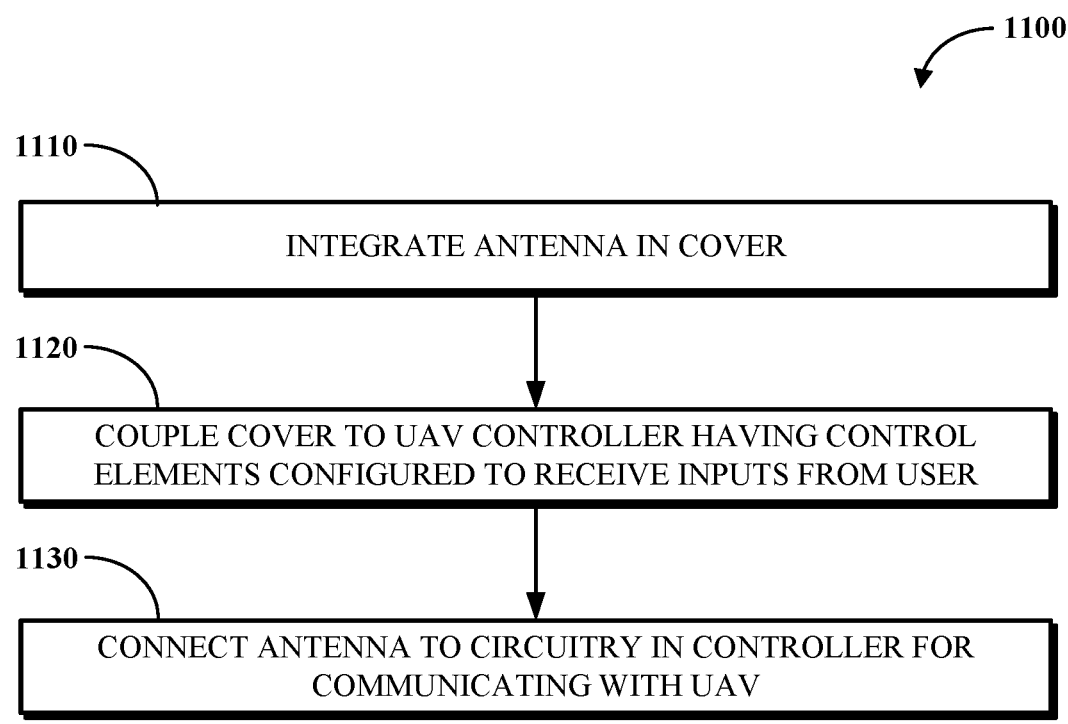
FIG. 11 is a flowchart of an example of a process for implementing a controller for a UAV.

FIG. 11 is a flowchart of an example of a process 1100 for implementing a controller for a UAV. The process 1100 may include integrating 1110 one or more antennas in a cover; coupling 1120 the cover to a UAV controller having control elements configured to receive inputs from a user; and electrically connecting 1130 the one or more antennas to circuitry in the controller for communicating with a UAV.

The process 1100 may include integrating 1110 one or more antennas in a cover. In some implementations, an array of antennas, such as at least four antennas, may be integrated in the cover. The antenna may be like one or more of the antennas 316A through 316D shown in FIGS. 3-4. The cover may be like the cover 106 shown in FIG. 1, the cover 206 shown in FIG. 2, the cover 306 shown in FIGS. 3 and 4, the cover 506 shown in FIG. 5, and/or the cover 606 shown in FIGS. 6-8. The antennas may be mounted to the cover, such as via screws, while being electrically isolated from the cover. In some implementations, the antennas may comprise electrically conductive strips. In some implementations, the antennas may comprise electrically conductive trace antennas embedded into a multilayer PCB. In some implementations, the antennas may comprise MIMO antennas configured to implement multipath propagation. In some implementations, the antennas may implement Wi-Fi. The antennas may be configured to direct RF energy upward in a direction overhead, toward a UAV, when the cover is in the open position (e.g., beamforming). The cover may also include an interior cavity. The interior cavity may provide a volume to enclose (e.g., at least partially enclose) control elements (e.g., the control elements 104A through 104K) of the controller when the cover is in the closed position, including control elements in the first subset (e.g., buttons) and/or control elements in the second subset (e.g., joysticks).

Thus, the cover may be configured to protect the antennas and the control elements when the cover is in the closed position and at least protect the antennas when the cover is in the open position.

In some implementations, an interior base like the interior base 522 shown in FIG. 5 may be integrated in the cover. For example, the interior base may be integrated with the cover via mounting screws. The interior base may follow a contour of an interior cavity of the cover. In some implementations, the interior base may comprise a conductive plane. The conductive plane may comprise an electrically conductive material. The conductive plane may be configured to further direct RF energy associated with the antennas in a direction toward a UAV. In some implementations, the interior base may comprise an insulating plane. The insulating plane, like the cover, may comprise an electrically insulating material (e.g., plastic). The insulating plane may be configured to electrically isolate the antennas from the control elements (e.g., the control elements 104A through 104K) and/or the user. In some implementations, the interior base may comprise both a conductive plane and an insulating plane. The conductive plane and the insulating plane may be implemented on opposing sides of one another. For example, the conductive plane may be on a first of the interior base facing the antennas, and the insulating plane may be on a second of the interior base facing the control elements, the user, and the like. Thus, when the interior base comprises the conductive plane and the insulating plane, the conductive plane may be between the antennas and insulating plane, and the insulating plane may be between the conductive plane and the control elements, the user, and the like.

The process 1100 may also include coupling 1120 the cover to a controller having control elements configured to receive inputs from a user. The controller may be like the controller 102 shown in FIG. 1, the controller 202 shown in FIG. 2, and/or the controller 602 shown in FIGS. 6-9. The controller may be a handheld wireless UAV controller that is configured to be operated by a user to control flight of a UAV. The controller may have control elements configured to receive inputs from a user and/or provide outputs to a user, such as control elements 104A through 104K. The control elements may include a first subset of control elements and/or a second subset of control elements. The cover may be coupled to the controller. The cover may be movable between a closed position in which the control elements (e.g., the control elements 104A through 104K) are covered and an open position in which the control elements are exposed. In the open position, the control elements may be accessible to a user (e.g., a user holding the controller may access the control elements 104A through 104K). In some implementations, the cover may be coupled to the controller in a manner that provides rotational movement between the cover and the controller. For example, the cover may be coupled to the controller via one or more hinges that may be arranged at couplings (e.g., the couplings 108A and 108B). In some implementations, the cover may be configured as a clamshell that is coupled (e.g., pivotally coupled) to the controller by a hinge.

In some implementations, the controller may include a heatsink (e.g., the heatsink 630) which may comprise multiple fins. The heatsink may be arranged on the under portion of the controller. The heatsink may be used to cool circuitry that is arranged inside the controller. In some implementations, the controller may also include a fan (e.g., the fan 632). The fan may also be arranged on the under portion of the controller. The fan may be coupled with the heatsink. In some implementations, the controller may include a support mechanism (e.g., the support mechanism 640). The support mechanism may be arranged on the under portion of the controller. The support mechanism may be configured to move between an outward position in which the support mechanism supports the controller when the controller is on a surface and an inward position in which the support mechanism is retracted and stowed along a contour of the under portion of the controller (e.g., folded into the controller).

The process 1100 may also include electrically connecting 1130 the one or more antennas to circuitry in the controller for communicating with a UAV. The antennas may be electrically connected to communications circuitry inside the controller for communicating with a UAV. For example, the antennas may be electrically connected to the communications circuitry via wiring (e.g., the wires 318A through 318D) that is routed through or along couplings (e.g., couplings 308A and 308B) to the controller. The antennas may be used to implement RF communications with a UAV. Using the controller to control a UAV may involve opening the cover to the open position (e.g., rotating the cover upward, away from the control elements) to permit a user to access the control elements. Thus, opening the cover may expose the control elements. Additionally, opening the cover may cause the antennas that are integrated in the cover to angle upward (e.g., with the cover) in a direction overhead, toward a UAV. This may permit an improved line of sight between the antennas and the UAV for improved radio communication (and thus, an improved operating range).

In some implementations, the controller may implement relatively more sensitive circuitry, such as IMU circuitry configured to provide IMU measurements via one or more IMU components. In such implementations, the controller may implement a circuit board that includes a cutout configured to separate the relatively more sensitive circuitry from other circuitry 1002, such as by a windy circuit board lead or an air gap.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law

What is claimed is:

1. An apparatus, comprising:
   a controller of an unmanned aerial vehicle (UAV) having control elements configured to receive inputs;
   a cover coupled to the controller and movable between a closed position, in which the control elements are covered, and an open position, in which the control elements are exposed, wherein the cover includes:
   one or more ribs integrated into an interior surface of the cover, the one or more ribs defining cavities of the cover, and
   a conductive plane coupled to the one or more ribs, wherein the one or more ribs extend away from the interior surface of the cover in a direction that is transverse to the conductive plane such that the conductive plane extends across the one or more ribs to enclose the cavities; and
   antennas integrated into the cover and electrically connected to circuitry of the controller.

2. The apparatus of claim 1, wherein each of the antennas is located in a separate one of the cavities such that the antennas are separated by at least a portion of the one or more ribs.

3. The apparatus of claim 1, wherein the one or more ribs comprise an electrically conductive material.

4. The apparatus of claim 3, wherein the conductive plane is in electrical contact with the one or more ribs such that the conductive plane and the one or more ribs tune a radio frequency (RF) energy associated with the antennas to communicate with the UAV.

5. The apparatus of claim 4, wherein the conductive plane and the one or more ribs direct the RF energy in a direction away from a user when the user holds the controller.

6. The apparatus of claim 1, wherein the cover further includes an insulating plane coupled to the conductive plane.

7. The apparatus of claim 6, wherein the insulating plane and the conductive plane are positioned between the antennas and the control elements of the controller.

8. The apparatus of claim 6, wherein the insulating plane is disposed along a surface of the conductive plane such that the conductive plane is positioned between the one or more ribs and the insulating plane.

9. The apparatus of claim 1, wherein the interior surface of the cover, the one or more ribs, and the conductive plane enclose the antennas in each of their respective cavities.

10. The apparatus of claim 1, wherein the antennas are electrically connected to the circuitry in the controller via wiring routed through or along one or more hinges that couple the cover to the controller.

11. The apparatus of claim 1, wherein the cover defines an interior volume that includes the cavities, and the control elements of the controller are located in the interior volume when the cover is in the closed position.

12. A system, comprising:
    an unmanned aerial vehicle (UAV);
    a controller in wireless communication with the UAV;
    a cover pivotally coupled to the controller and that defines an interior space, wherein the cover includes an interior base disposed over the interior space to enclose the interior space, the interior base including:
       a conductive plane forming a first layer of the interior base that is disposed over the interior space, and
       an insulating plane forming a second layer of the interior base that is coupled to the conductive plane; and
    one or more antennas located in the interior space of the cover and in communication with the controller such that the conductive plane faces the one or more antennas and the conductive plane is positioned between the one or more antennas and the insulating plane, wherein the one or more antennas are located in separate and spaced apart cavities defined within the interior space of the cover.

13. The system of claim 12, wherein the one or more antennas are electrically connected to the controller and in wireless communication with the UAV.

14. The system of claim 12, wherein a conductive material is disposed in the interior space and in electrical contact with the conductive plane, and wherein the interior base extends across the cavities to enclose the one or more antennas in a respective one of the cavities.

15. The system of claim 12, wherein the cover is movable between a closed position, in which control elements of the controller are located within the interior space of the cover, and an open position, in which the control elements are spaced apart from the interior space.

16. The system of claim 15, wherein the insulating plane electrically isolates the one or more antennas from the control elements.

17. An apparatus, comprising:
    a controller of an unmanned aerial vehicle (UAV);
    a cover movably coupled to the controller and that includes:
       an interior surface that defines an interior space of the cover,
       one or more ribs extending from the interior surface and located within the interior space of the cover, and an interior base disposed across terminal ends of the one or more ribs and extending in a direction transverse to the one or more ribs to enclose the interior space of the cover, wherein the interior base includes an insulating plane that is free of direct contact with the cover; and one or more antennas located within the interior space of the cover and at least partially enclosed by the interior surface, the one or more ribs, and the interior base.

18. The apparatus of claim 17, wherein the one or more antennas are in electrical communication with control elements of the controller via wiring routed along or through one or more hinges that movably couple the cover to the controller.

19. The apparatus of claim 17, wherein the interior base includes a conductive plane that is coupled to the insulating plane and coplanar with the insulating plane.

20. The apparatus of claim 19, wherein the conductive plane is disposed across and contacts the terminal ends of the one or more ribs to enclose the interior space of the cover.

* * * * *